United States Patent
Takeuchi (10) Patent No.: US 9,979,843 B2
(45) Date of Patent: May 22, 2018

(54) PRINTING SYSTEM, PRINTING DEVICE, REWARD MANAGEMENT DEVICE, AND NON-TRANSITORY COMPUTER READABLE MEDIUM

(71) Applicant: FUJI XEROX CO., LTD., Tokyo (JP)

(72) Inventor: Yuichi Takeuchi, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days. days.

(21) Appl. No.: 15/238,517

(22) Filed: Aug. 16, 2016

(65) Prior Publication Data
US 2017/0272586 A1  Sep. 21, 2017

(30) Foreign Application Priority Data
Mar. 15, 2016 (JP) ................................ 2016-050723

(51) Int. Cl.
H04N 1/34 (2006.01)
H04N 1/00 (2006.01)
G06Q 30/02 (2012.01)

(52) U.S. Cl.
CPC ..... *H04N 1/00344* (2013.01); *G06Q 30/0207* (2013.01); *H04N 1/344* (2013.01); *H04N 2201/0094* (2013.01)

(58) Field of Classification Search
CPC ........................... H04N 1/344; G06Q 30/0207
See application file for complete search history.

(56) References Cited

U.S. PATENT DOCUMENTS

| | | | |
|---|---|---|---|
| 6,865,545 B1* | 3/2005 | Epstein | B41J 11/0005 705/14.26 |
| 7,013,288 B1* | 3/2006 | Reifel | G06Q 10/00 705/14.1 |
| 9,118,787 B1* | 8/2015 | Fu | H04N 1/00347 |
| 9,473,665 B1* | 10/2016 | Fu | H04N 1/00347 |
| 2002/0039193 A1* | 4/2002 | Kondo | G06Q 30/02 358/1.14 |
| 2002/0049638 A1* | 4/2002 | Ito | G06Q 30/0239 705/14.39 |
| 2002/0105658 A1* | 8/2002 | Jackson | G06Q 30/0641 358/1.2 |
| 2003/0151768 A1* | 8/2003 | Iida | G03G 21/02 358/1.15 |
| 2003/0218330 A1* | 11/2003 | Mortimer | B42D 15/00 283/81 |

(Continued)

FOREIGN PATENT DOCUMENTS

JP  2003-345864 A  12/2003
JP  2006-350804 A  12/2006

*Primary Examiner* — Ted Barnes
(74) *Attorney, Agent, or Firm* — Oliff PLC (57) ABSTRACT

There is provided a printing system. A reward information memory stores reward identification information and an upper limit amount in association with each other. A set charge memory stores a usage charge for each print setting. A specification unit obtains an upper limit amount in association with the input reward identification information from the reward information memory, and specifies selectable print settings within a range of the upper limit amount from the information stored in the set charge memory. A controller controls the execution of printing so as to be executed with the print settings specified by the specification unit.

7 Claims, 7 Drawing Sheets

(56) References Cited

U.S. PATENT DOCUMENTS

| | | | | |
|---|---|---|---|---|
| 2003/0220836 | A1* | 11/2003 | Mortimer | B42D 15/00 705/14.25 |
| 2004/0138945 | A1* | 7/2004 | Adkins | G03G 21/02 705/14.23 |
| 2004/0207885 | A1* | 10/2004 | Jackson | G06Q 30/0641 358/453 |
| 2004/0210534 | A1* | 10/2004 | Jackson | G06Q 30/0641 705/52 |
| 2005/0099442 | A1* | 5/2005 | Payne | G06K 15/007 347/14 |
| 2005/0154641 | A1* | 7/2005 | Mortimer | B42D 15/00 705/14.25 |
| 2009/0070264 | A1* | 3/2009 | Buck | G03G 21/02 705/44 |
| 2009/0073475 | A1* | 3/2009 | Jones | G03G 21/02 358/1.12 |
| 2009/0076964 | A1* | 3/2009 | Jackson | G06Q 30/0641 705/52 |
| 2009/0094134 | A1* | 4/2009 | Toomer | G06Q 10/10 705/26.1 |
| 2010/0268591 | A1* | 10/2010 | Gnanasambandam | G06F 3/1203 705/14.37 |
| 2010/0325050 | A1* | 12/2010 | Ito | B41M 5/00 705/50 |
| 2011/0128568 | A1* | 6/2011 | Bhogal | G06F 3/1204 358/1.15 |
| 2011/0313827 | A1* | 12/2011 | Lobb | G06Q 30/0207 705/14.12 |
| 2012/0320408 | A1* | 12/2012 | Evevsky | G06F 3/1243 358/1.15 |
| 2013/0307998 | A1* | 11/2013 | Tautenhahn | H04N 1/00289 348/207.1 |
| 2014/0200994 | A1* | 7/2014 | Carignani | G06Q 30/02 705/14.45 |
| 2014/0218759 | A1* | 8/2014 | Pridmore | G03G 15/5075 358/1.15 |
| 2015/0036176 | A1* | 2/2015 | Naruse | H04N 1/00925 358/1.15 |
| 2015/0100398 | A1* | 4/2015 | Narayanaswami | G06Q 30/0236 705/14.16 |
| 2015/0127441 | A1* | 5/2015 | Feldman | G06Q 30/0215 705/14.17 |
| 2015/0244878 | A1* | 8/2015 | MacAuley | G06F 3/1204 358/1.2 |
| 2015/0254694 | A1* | 9/2015 | Filip | G06Q 30/0207 705/14.1 |
| 2016/0036999 | A1* | 2/2016 | Kaye | G06F 3/1204 358/1.13 |
| 2017/0006183 | A1* | 1/2017 | Tagaki | H04N 1/346 |

* cited by examiner

| PRINT SETTING | UNIT PRICE |
|---|---|
| BLACK AND WHITE PRINTING | 10 YEN |
| COLOR PRINTING | 50 YEN |
| POSTER PRINTING | 200 YEN |
| ... | |

FIG. 3

| FREE CONTENT NUMBER | PROVIDING COMPANY ID | NUMBER OF PROVIDING TIMES/ UPPER LIMIT OF PROVIDING TIMES (NUMBER OF COUPONS) | EXPIRY DATE | UPPER LIMIT AMOUNT (YEN) | BILLING AMOUNT (YEN) |
|---|---|---|---|---|---|
| ABC12345 | COMPANY A | 50/200 | 2016/1/31 | 30 | 1500 |
| ABC12345 | COMPANY B | 50/200 | 2016/1/31 | 20 | 1000 |
| DEF67890 | COMPANY C | 0/100 | 2016/3/20 | 50 | 0 |
| GHI12345 | COMPANY A | 50/1000 | 2016/1/31 | 10 | 500 |

FIG. 4

| FREE CONTENT NUMBER | COUPON NUMBER | FLAG FOR CHECKING USAGE |
|---|---|---|
| ABC12345 | xxxx0000 | USED |
| | ... | ... |
| | xxxx0200 | NOT USED |
| ... | ... | ... |

FIG. 5

| FREE CONTENT NUMBER | GOAL OF NUMBER OF PROVIDING TIMES | AUTOMATIC ADDITION VALUE(YEN) WHEN GOAL IS NOT ACHIEVED | GOAL ACHIEVEMENT CHECK DATE | EXPIRY DATE |
|---|---|---|---|---|
| ABC12345 | 100 | 20 | 2016/1/21 | 2016/1/31 |
| DEF67890 | 50 | 10 | 2016/3/5 | 2016/3/20 |
| GHI12345 | - | - | - | 2016/1/31 |

FIG. 6

| FREE CONTENT NUMBER | ADDITION AMOUNT (YEN) | PERIOD FOR PREMIUM UPPER LIMIT AMOUNT | EXPIRY DATE |
|---|---|---|---|
| ABC12345 | 20 | 2016/1/1 ~ 2016/1/10 | 2016/1/31 |
| DEF67890 | 10 | 2016/3/1 ~ 2016/3/5 | 2016/3/20 |
| GHI12345 | - | - | 2016/1/31 |

FIG. 7

| FREE CONTENT NUMBER | PRINT SETTING | NUMBER OF TIMES |
|---|---|---|
| ABC12345 | BLACK AND WHITE PRINTING | 0 |
| ABC12345 | COLOR PRINTING | 10 |
| ABC12345 | POSTER PRINTING | 10 |
| ... | ... | ... |

PRINTING SYSTEM, PRINTING DEVICE, REWARD MANAGEMENT DEVICE, AND NON-TRANSITORY COMPUTER READABLE MEDIUM

CROSS-REFERENCE TO RELATED APPLICATIONS

This application is based on and claims priority under 35 USC 119 from Japanese Patent Application No. 2016-050723 filed Mar. 15, 2016.

TECHNICAL FIELD

The present invention relates to a printing system, a printing device, a reward management device, and a non-transitory computer readable medium storing a program.

RELATED ART

In using a printing device, there is an example of providing a reward such as a coupon to a user.

SUMMARY

According to an aspect of the embodiments of the present invention, there is provided a printing system comprising: a reward information memory that stores reward identification information and an upper limit amount in association with each other; a set charge memory that stores a usage charge for each print setting; a specification unit that obtains an upper limit amount in association with the input reward identification information from the reward information memory, and specifies selectable print settings within a range of the upper limit amount from the information stored in the set charge memory; and a controller that controls the execution of printing so as to be executed with the print settings specified by the specification unit.

BRIEF DESCRIPTION OF THE DRAWINGS

Exemplary embodiments of the present invention will be described in detailed based on the following figures, wherein.

DETAILED DESCRIPTION

Figure 1:
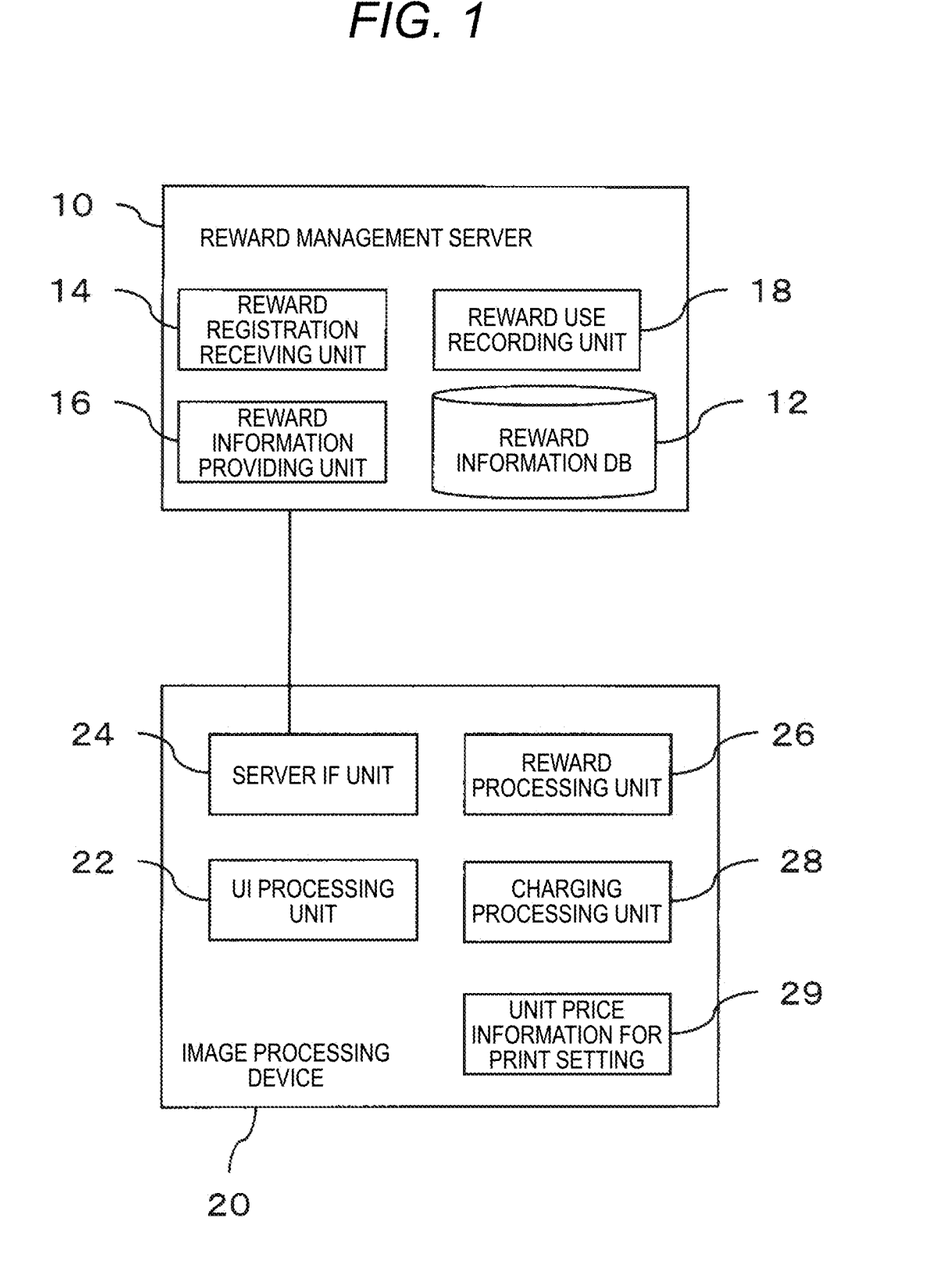
FIG. 1 illustrates a system configuration example in an exemplary embodiment.

A system configuration in an exemplary embodiment of the present invention will be described with reference to FIG. 1. As illustrated in the figure, the system in the present exemplary embodiment includes a reward management server 10 and an image processing apparatus 20. The reward management server 10 and the image processing apparatus 20 are communicable to each other via a network such as the Internet. Only one image processing apparatus 20 is illustrated in the figure, however, the reward management server 10 may be connected to a plural number of image processing apparatuses 20.

The reward management server 10 is a server that manages the rewards provided to a user via the image processing apparatus 20. Hereinafter, a case of providing the user with a free printing reward for printing image content such as idol pictures will be described as an example. The reward management server 10 includes a reward information DB (database) 12, a reward registration receiving unit 14, a reward information providing unit 16, and a reward use recording unit 18.

The reward information DB 12 is a database in which various information items for providing the reward are stored and managed. The reward information DB 12 stores content data provided as the reward or history information in a case where the content is printed as the reward. The data stored in the reward information DB 12 will be specifically described later. The reward registration receiving unit 14 executes processing that receives a registration of the provided reward from a provider of the reward (content). The reward information providing unit 16 provides the image processing apparatus 20 with the reward information requested from the user (a person who receives the reward). In a case where the reward is used at the image processing apparatus 20 (free content is printed), the reward use recording unit 18 records the information about the use in the reward information DB 12. Specific examples of the function of each unit will be described later.

The image processing apparatus 20 is an apparatus installed at a store or the like and has a function of printing. For example, a multifunction device is an example thereof. In addition, the image processing apparatus 20 includes a user interface (UI) processing unit 22, a server IF unit 24, a reward processing unit 26, and a charging processing unit 28. In addition, the image processing apparatus 20 stores the unit price information 29 for print setting.

The UI processing unit 22 performs processing as a user interface function of the image processing apparatus 20. In the context in the present exemplary embodiment, the UI processing unit 22 provides a UI screen for using the reward provided from the reward management server 10, receives formation input to the UI screen from the user, and notifies the related processing unit of the received input information.

The server interface (IF) unit 24 performs exchange of communication between the reward management server 10 and the image processing apparatus 20. For example, the server IF unit 24 acquires the reward information from the reward management server 10, or sends the history information of the printing to the reward management server 10 in a case where the printing is performed using the reward information.

The reward processing unit 26 receives an instruction from the user to use the reward, and executes the processing to use (prints) the instructed reward.

The charging processing unit 28 performs charging (charge settlement) for the functions (services) such as printing or scanning used by the user in the image processing apparatus 20. In a case of the free service reward treated in the exemplary embodiment, a case can be considered, in which the user does not pay for the basic charge, but the user can accept high cost printing by paying an additional charge within an amount of free service reward range. In such a case, the charging processing unit 28 performs the settlement of the additional charge.

The unit price information 29 for print setting is information representing unit prices for using each of the usable print setting items in the image processing apparatus 20. The print setting is a print condition represented by a combination of, for example, the size of the sheet, color or black and white printing, simplex or duplex printing, and the presence or absence of using various special type of printing. The special printing includes a case of using special sheet such as a postcard or photographic paper, or a case of applying a special effect such as gloss. The image processing apparatus 20 may have a few types of special printing functions. The unit price for the print setting is a charge per one sheet of a print out in a case where the printing is performed based on the print setting.

Figure 2:
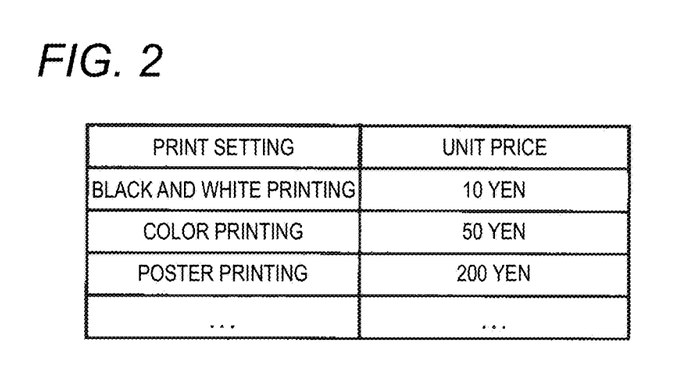
FIG. 2 illustrates an example of unit price information for print setting.

FIG. 2 illustrates an example of information content of the unit price information 29 for print setting. In this example, the unit prices are defined for example: a unit price for black and white printing is 10 yen, a unit price for color printing is 50 yen, and a unit price for poster printing is 200 yen. Incidentally, the poster printing is a special printing in which a large image is, for example, divided to be printed on four sheets of A4 size, and then, those four sheets of print-outs are combined to represent the image as a single poster. In the example in FIG. 2, the size of the sheet in the image processing apparatus 20 is fixed to one type (for example, A4 sheet only). In a case where a plural types of sheet are used in the image processing apparatus 20, the unit price of print setting may be individually determined for each size of sheet such as a case where the unit price becomes different for each size of sheet in black and white printing.

Next, various information items stored in the reward information DB 12 will be exemplified with reference to FIG. 3 to FIG. 7.

Figure 3:
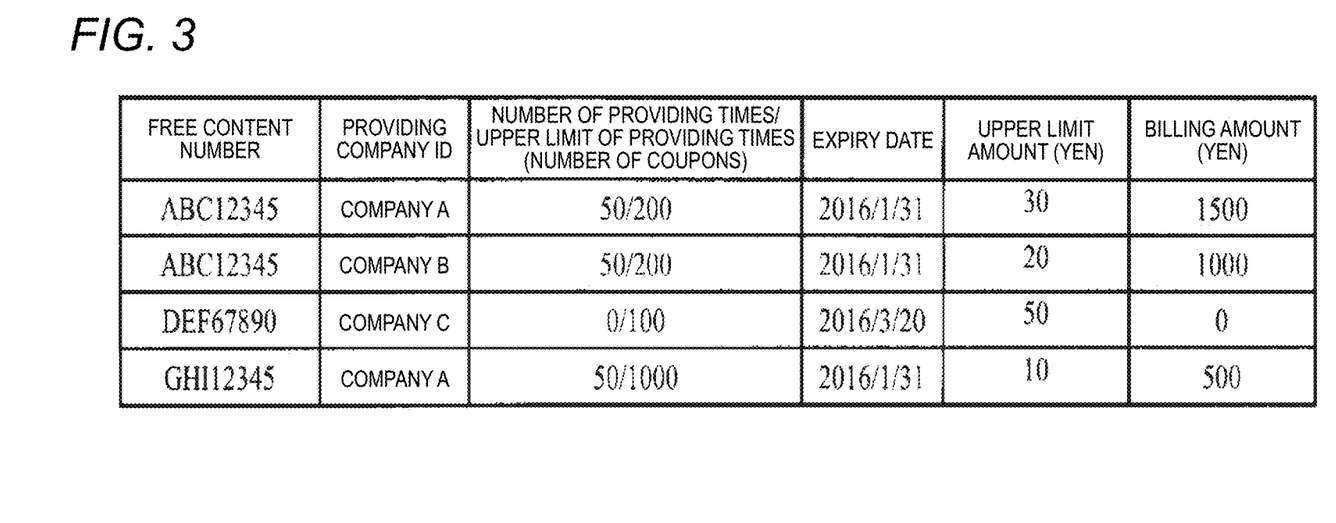
FIG. 3 illustrates an example of reward management information.

FIG. 3 illustrates an example of the reward management information stored in the reward information DB 12. The information illustrated in FIG. 3 includes items of a free content number, a providing company ID, the number of providing times/an upper limit number of providing times, an expiry date, an upper limit amount, and a billing amount. The free content number is identification information of the free content provided to the user as a reward. The providing company ID is identification information of a company providing the reward. The number of providing times in the number of providing times/upper limit number of providing times is the number times the rewards are provided up to the current time (the number of times the free content is actually printed), and the upper limit number of providing times is the upper limit number of times the providing company can provide the reward. The expiry date is a time limit for the reward being provided. The upper limit amount is an upper limit amount that can be provided to the user with regard to the reward provided by the providing company. The user receiving the reward can select the usable print settings within the range of the upper limit amount, and can print the free content by the selected print settings. The billing amount is an amount billed to the provider of the reward at the current time from a store manager that manages the group of the reward management server 10 and the image processing apparatus 20, and is a sum of the usage charges for the image processing apparatus 20 in relation to the printing of the reward content. In the illustrated example, the billing amount is "the upper limit amount×the number of providing times". However, since the upper limit amount for all of the rewards is not fully used, the billing amount may be a sum of the amounts of actually used rewards.

Figure 4:
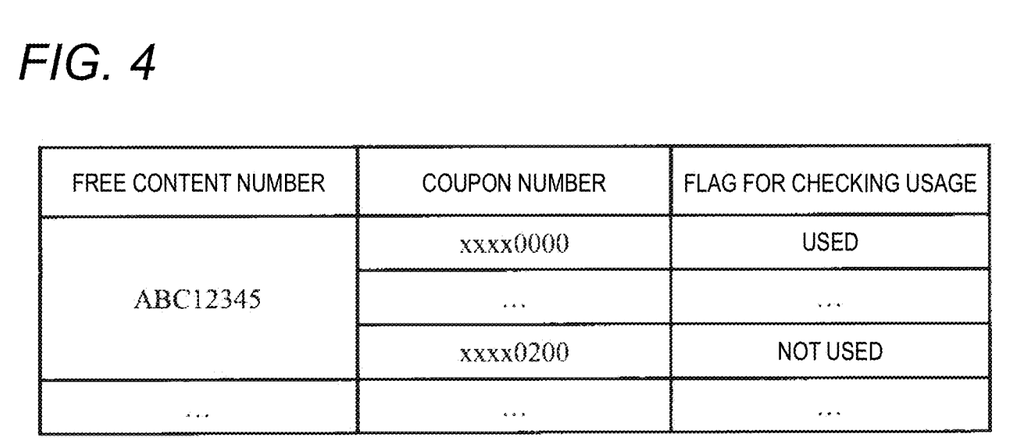
FIG. 4 illustrates an example of coupon management information.

FIG. 4 illustrates an example of coupon management information stored in the reward information DB 12. The coupon management information is information for managing a coupon passed to the user that is a reward granting destination. For example, the free content number, a coupon number, and a flag for checking the usage are included in the coupon management information. The free content number functions as identification information of the reward itself as described above. The coupon number is identification information of the coupon granted to the user. The coupon may be in a form of a ticket on which the coupon number is printed, or may be in a form of code information of character strings or the like representing the coupon number. The flag for checking the use is a flag indicating whether the coupon number has been used or not. In the example, a coupon number is limited to be used only one time.

Plural number of coupons is issued for one reward and distributed to the user. The coupon numbers of the coupons issued for the rewards indicated by the free content number is registered in the coupon management information in association with the free content number. An initial value of the flag for checking the usage is "not used", and in a case where a corresponding coupon is used, the value of the flag becomes "used". As illustrated in FIG. 4, the unique coupon numbers for each coupon are associated with a unique free content number for each reward. Therefore, one free content number (that is, the identification number of the reward) is uniquely determined with respect to one coupon number. Therefore, the coupon number also functions as the identification information of the reward.

Figure 5:
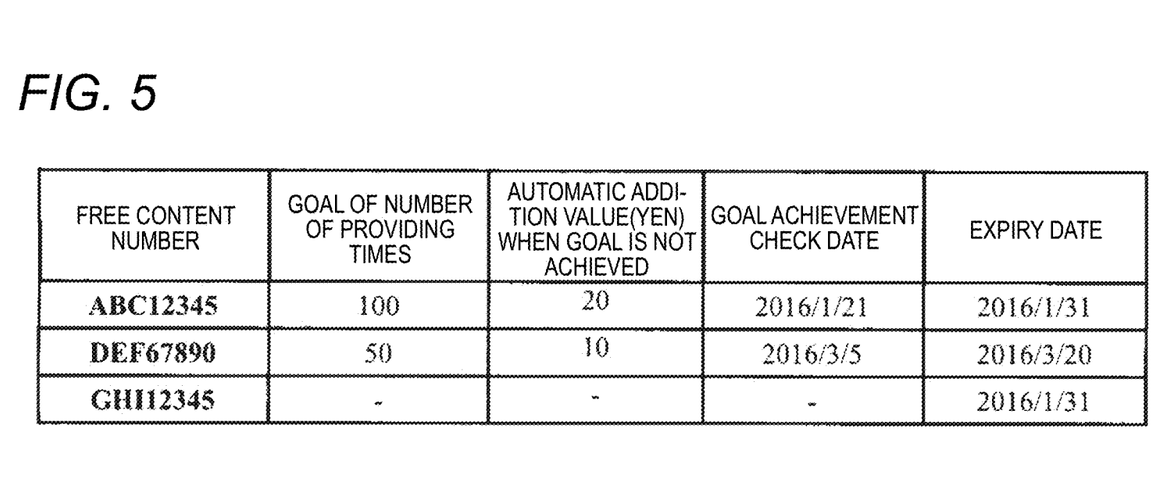
FIG. 5 illustrates an example of goal management information.

FIG. 5 illustrates an example of goal management information stored in the reward information DB 12. The goal management information is management information for achieving the goal of the reward providing. For example, items such as the free content number, a goal of the number of providing times, an automatic additional amount when the goal is not achieved, and a goal achievement check date are included in the goal management information. The goal of the number of providing times is the number of times of providing the reward (the number of times of actually using the reward) which is a goal of the reward providing company. The goal of the number of providing times is a value less than the upper limit number of providing times. The goal achievement check date is a date of checking whether or not the goal of the number of providing times is achieved, and is a date one day prior to the expiry date. The automatic additional amount when the goal is not achieved is an amount added to the upper limit amount in a case where the actual number of providing times does not reach the goal of the number of providing times at the time point of the goal achievement check date. For example, in a case where the number of providing times the free content "ABC12345" listed on the uppermost line of FIG. 5 does not reach 100 times until the date of Jan. 21, 2016, the value of the upper limit amount from that date to the expiry date becomes 50 yen by adding the additional amount 20 yen to 30 yen (refer to FIG. 3) up to that date. As described, the upper limit amount in which the additional amount is added is referred to as a premium upper limit amount. In many cases, it is desirable for the providing company to increase the use of the reward in a view point of sales promotion of related merchandise. Therefore, the registration of the goal of the number of providing times or the additional amount is received from the, providing company. In the example in which the goal management of providing the reward is not performed, the goal management information is not necessary.

Figure 6:
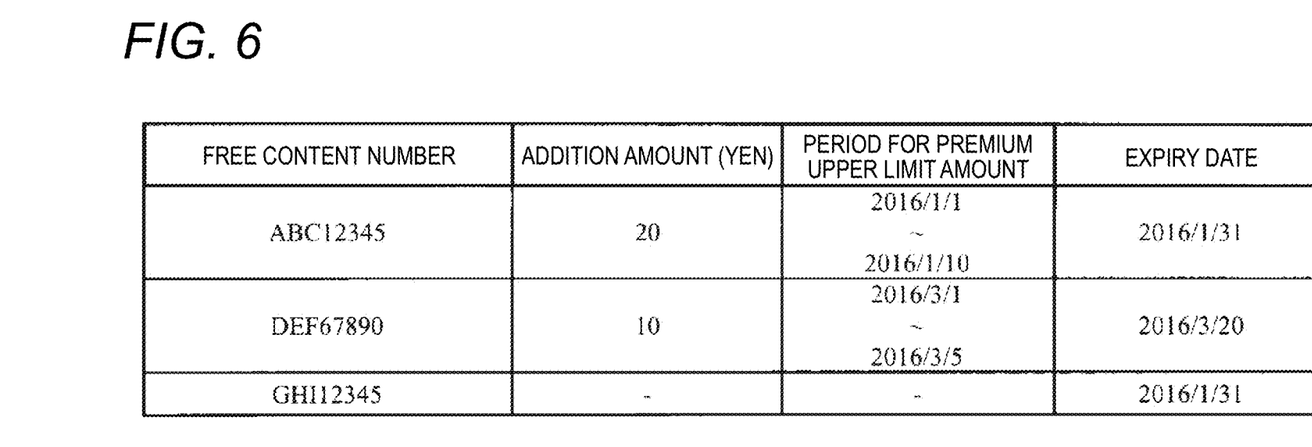
FIG. 6 illustrates an example of management information for a promotion of providing reward.

FIG. 6 illustrates an example of management information for a promotion of the reward providing stored in the reward information DB 12. The information includes information items of the free content number, the additional amount, a period for the premium upper limit amount, and the expiry date. The free content number and the expiry date have been already described. The period for the premium upper limit amount is a period during which the premium amount is added to the upper limit amount in order for the promotion of the reward providing. The additional amount is an amount to be added to the ordinary upper limit amount during the period for premium. For example, regarding the free content "ABC12345" listed on the uppermost line of FIG. 6, the ordinary upper limit amount is 30 yen. However, the upper limit amount becomes 50 yen by adding 20 yen during the period from Jan. 1, 2016 to Jan. 10, 2016. In the example in which the premium upper limit amount for the promotion of the reward providing during a limited period is not performed, the management information is not necessary.

Figure 7:
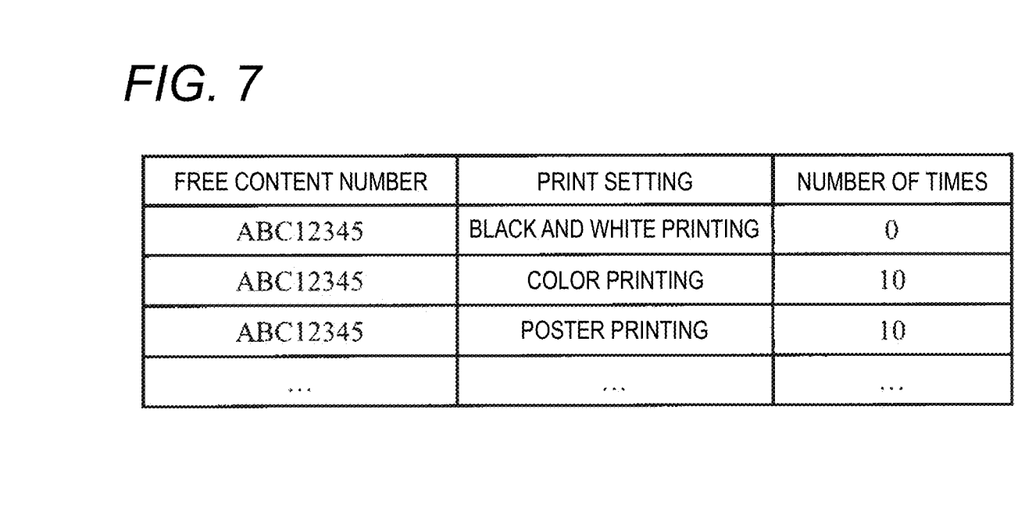
FIG. 7 illustrates an example of reward use summary information.

FIG. 7 illustrates an example of reward use summary information for each print setting stored in the reward information DB 12. This information indicates the number of times the free content is printed in each print setting. The illustrated example indicates that the free content "ABC12345" is not printed at all in the black and white printing, is printed 10 times in the color printing, and is printed 10 times in the poster printing. This information can be used as reference information for the providing company to check the using situation of the reward or to study a counter-action to the situation.

Additionally, the unit price information for print setting same as that stored in the image processing apparatus 20 is stored in the reward information DB 12.

Figure 8:
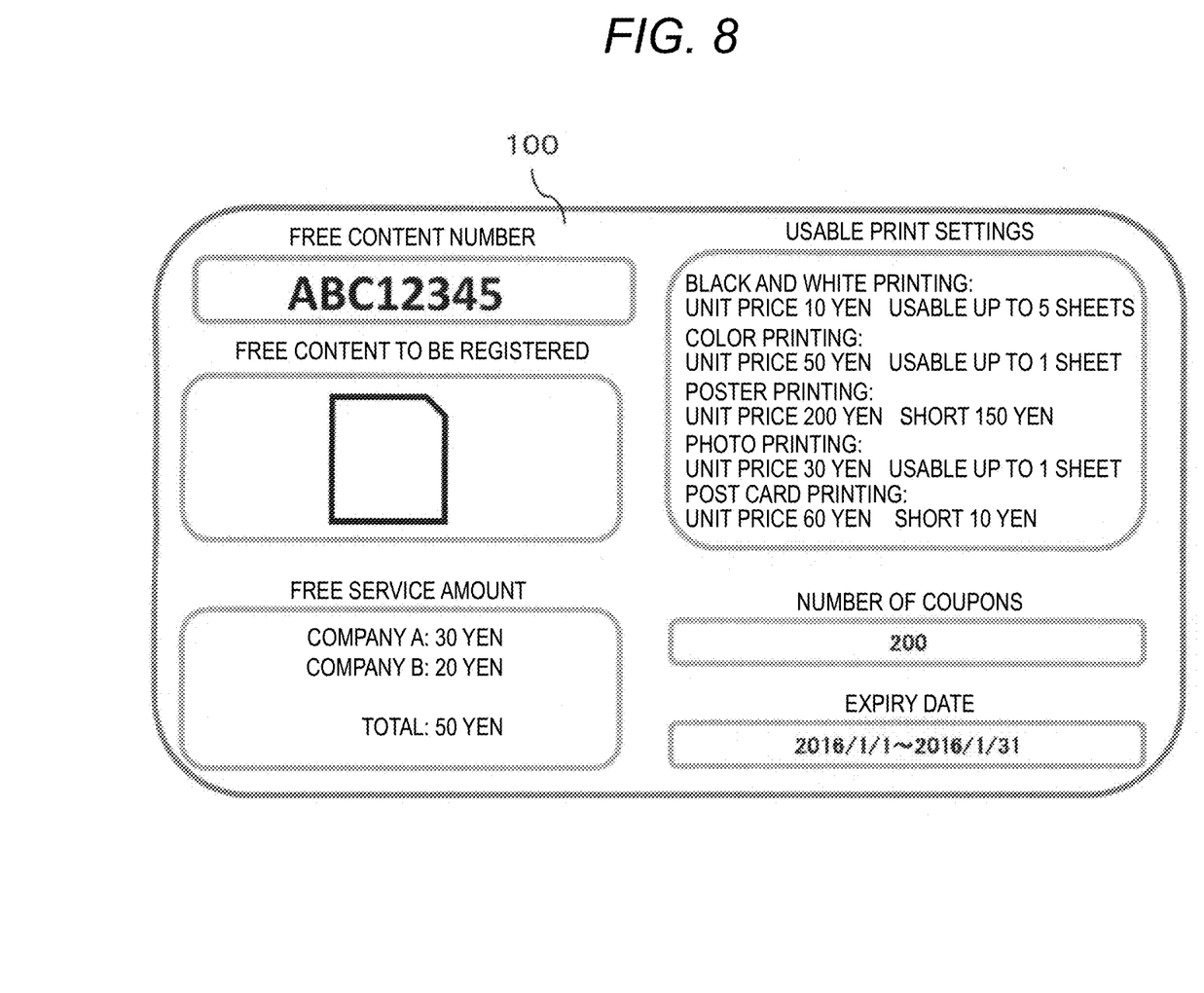
FIG. 8 schematically illustrates an example of a screen display for registering rewards presented by a reward registration receiving unit for a provider with the reward.

Next, the function of the reward registration receiving unit 14 will be described with reference to FIG. 8.

When receiving a login from a computer in the providing company, the reward registration receiving unit 14 provides a registration screen for providing the reward in a form of, for example, a webpage via the network. A staff in the providing company designates the free content to be registered and gives an instruction to register the free content on the registration screen. In this way, the data of the free content is transmitted to the reward registration receiving unit 14 from the computer in the providing company. The reward registration receiving unit 14 assigns identification information (free content number) to the received free content, and the data of the free content is stored in the reward information DB 12 in association with the number. Then, the reward registration receiving unit 14 provides the computer in the providing company with a reward condition setting screen 100 schematically illustrated in FIG. 8.

The free content number and a thumbnail image of the free content are displayed on the reward condition setting screen 100. In addition, an input field of "free service amount" (upper limit amount), a display field of "usable print settings", an input field of "number of coupons", and an input field of "providing period" are displayed on the reward condition setting screen 100.

The upper limit amount to be provided for the user from the providing company regarding the free content is input to the input field of "free service amount". In the illustrated example, 50 yen from two companies of company A and company B are input as the upper limit amount. For example, any of the company A and the company B register the free content, the company A and the company B are accessed to the reward condition setting screen with regard to the free content, the upper limit amount of reward from each company 30 yen and 20 yen are input in order, and then, the upper limit amount of total 50 yen is set.

A list indicating whether or not each of the print settings can be covered by the upper limit amount input in the field of "usable print settings" is displayed. In the illustrated example, as the print settings the user can use, it is indicated that, with the upper limit amount 50 yen, the black and white printing of which the unit price is 10 yen is available (up to 5 sheets), the color printing of which the unit price is 50 yen or the photo printing of which the unit price is 30 yen are available respectively. In addition, it is indicated that the upper limit amount is not enough for the poster printing of which the unit price is 200 yen and the postcard printing of which the unit price is 60 yen. In a case where the free content has a plural number of pages, the charge is calculated by "the unit price×the number of pages" for each print setting, and then, whether the upper limit amount can cover the calculated charge or how much it runs short is calculated and presented.

The number of coupons issued from the providing company with regard to the free content to be registered this time is input to the input field of the "number of coupons". This number is an upper limit number of providing times in the reward management information (FIG. 3).

A providing period (start time and end time) for reward of printing the free content from the providing company this time is input to the input field of "providing period". Among the start time and the end time, the end time is set as the expiry date of the reward management information (FIG. 3).

After the upper limit amount is input to the reward condition setting screen 100, the providing company adjusts the value of the upper limit amount while seeing the display in the field of "usable print settings". For example, the providing company seeing the reward condition setting screen 100 illustrated in FIG. 8 determines that, if the upper limit amount is increased to 60 yen by increasing 10 yen, the postcard printing can be available and the more reward is expected to be used. Thus, the providing company changes the upper limit amount to 60 yen.

Figure 9:
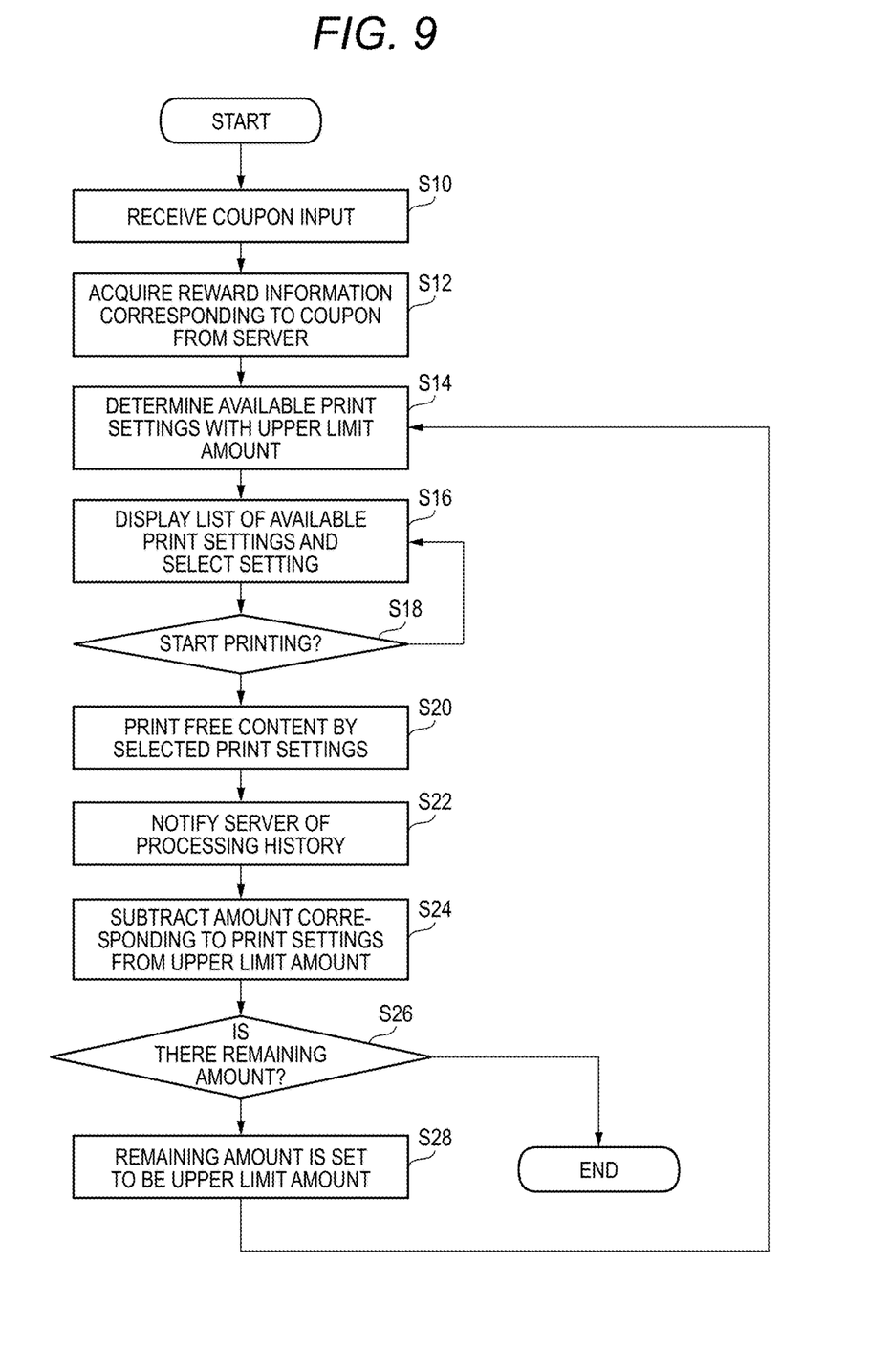
FIG. 9 illustrates an example of a processing procedure of an image processing apparatus in using the reward.

Next, an example of processing executed by the image processing apparatus 20 at the time of using the reward will be described with reference to FIG. 9.

First, the image processing apparatus 20 receives a coupon input from the user (S10). For example, a coupon ticket placed on an original document table is read using the scanning function of the image processing apparatus 20, a code such as a QR code (registered trademark) printed on the coupon ticket is read using the image code reading function included in the image processing apparatus 20, and then, a coupon number represented by the code is recognized. Alternatively, the UI processing unit 22 displays the input field of "coupon number" on the screen to cause the user to input the coupon number.

Next, the server IF unit 24 sends an inquiry including the input coupon number to the reward management server 10 (S12).

The reward information providing unit 16 in the reward management server 10 searches the reward information DB 12 for the information corresponding to the coupon number such as the free content number, the number of providing times/the upper limit number of providing times, the expiry date, and the upper limit amount. Then, if it is confirmed that the number of providing times does not reach the upper limit number of providing times and the expiry date has not passed yet, the reward management server 10 returns the reward information including the free content number, the actual data of the content corresponding to the number, and the upper limit amount to the server IF unit 24 in the image processing apparatus 20. The server IF unit 24 transfers the acquired reward information to the reward processing unit 26.

Here, in the example in which the goal management of the providing the reward is performed, the reward information providing unit 16 may control the upper limit amount transferred to the image processing apparatus 20 with reference to the goal management information (refer to FIG. 5) in the reward information DB 12. That is, the reward information providing unit 16 determines whether or not the current date is after the goal achievement check date corresponding to the free content number. If the current date is prior to the goal achievement check date, the upper limit amount indicated in the reward management information (FIG. 3) is transferred to the image processing apparatus 20. Conversely, if the current date is after the goal achievement check date, the reward information providing unit 16 further determines whether or not the number of providing times the free content number registered in the reward management information reaches the goal of the number of providing times in the goal management information. If the number of providing times reaches the goal of the number of providing times, the upper limit amount indicated in the reward management information is transferred to the image processing apparatus 20. If the number of providing times does not reach the goal of the number of providing times, the premium upper limit amount in which the additional amount indicated in the goal management information is added to the upper limit amount indicated in the reward management information, is transferred to the image processing apparatus 20 as the upper limit amount.

In addition, in the example of performing the premium upper limit amount for the promotion of the reward providing during a limited period, the reward information providing unit 16 may control the upper limit amount transferred to the image processing apparatus 20 with reference to the management information (refer to FIG. 6) in the reward information DB 12 for the promotion of the reward providing. That is, the reward information providing unit 16 determines whether or not the current date is within the period for premium corresponding to the free content number. If the current date is not within the period for premium, the upper limit amount indicated in the reward management information (FIG. 3) is transferred to the image processing apparatus 20. Conversely, if the current date is within the period for premium, and further if the number of providing times regarding the free content number recorded in the reward management information does not reach the goal of the number of providing times, the premium upper limit amount in which the additional amount indicated in the goal management information in FIG. 6 is added to the upper limit amount indicated in the reward management information, is transferred to the image processing apparatus 20 as the upper limit amount.

The reward processing unit 26 determines the selectable print settings for printing based on the received reward information (S14). In this determination, for example, the unit price of each print setting included in the unit price information 29 for print setting is multiplied by the number of pages of the content included in the reward information, and then the printing charge in a case of using each of the print settings is obtained. Then, if the obtained printing charge relating to the print settings is equal to or lower than the upper limit amount included in the upper limit amount, it is determined that the print setting is selectable as the free service reward. In a case where the free content treated by the reward management server 10 is limited to only one page of image, the unit price of the print setting and the upper limit amount may simply be compared with each other.

Next, the reward processing unit 26 displays the print setting selection screen on which a list of print settings determined to be selectable in S14 is displayed, on the display device included in the image processing apparatus 20 (S16).

Figure 10:
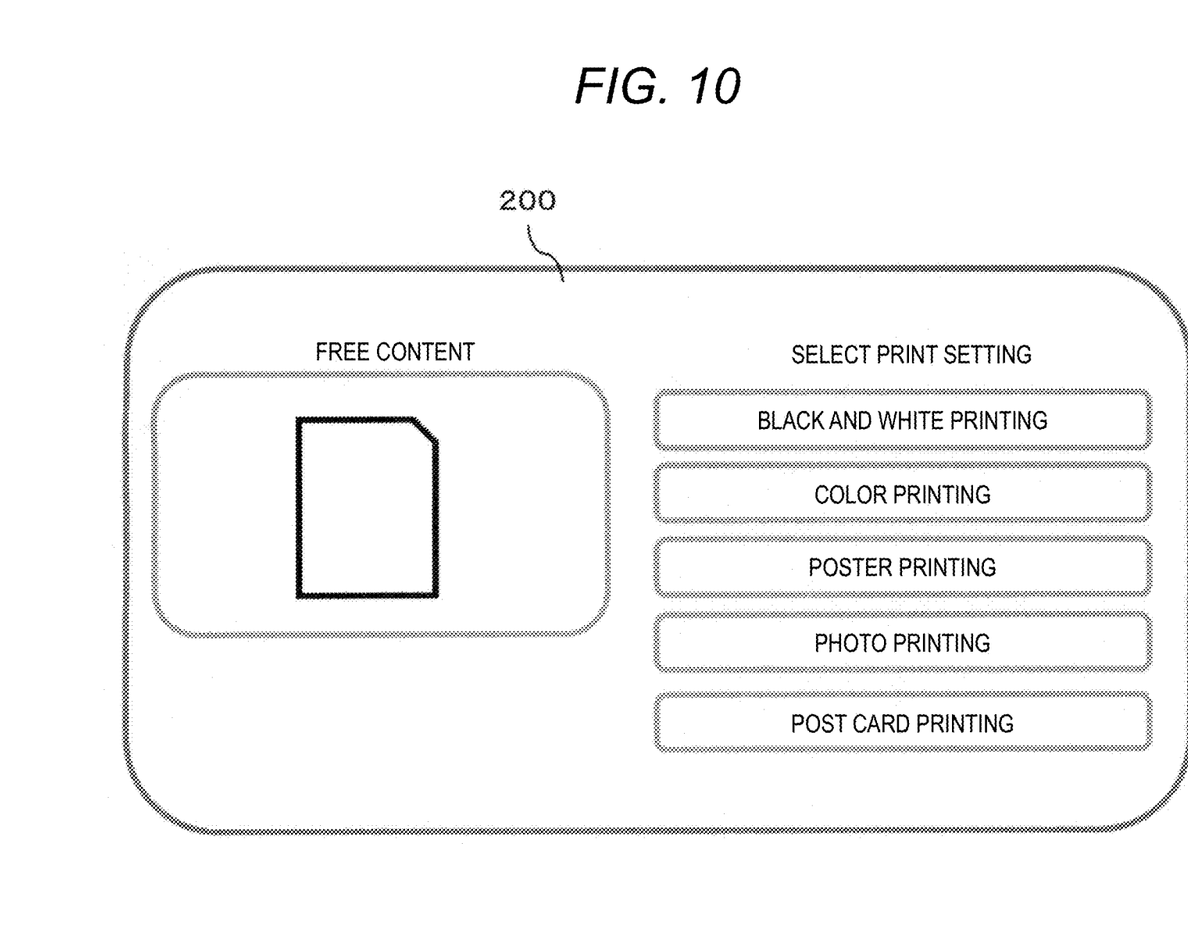
FIG. 10 schematically illustrates an example of a print setting selection screen displayed by the image processing apparatus.

FIG. 10 illustrates an example of a print setting selection screen 200 displayed at this stage. In the example, a thumbnail image of the free content which is the reward and fields for inputting the selectable print settings such as the "black and white printing", "color printing", and the like (fields of "selection for the print settings" in FIG. 10) are displayed. The display of each print setting included in the list is configured in a form of graphic user interface (GUI), and thus, the user presses the buttons of desired print settings.

In this example, only the print setting of which the printing charge in a case of printing the target content is equal to or less than the upper limit amount of the reward is presented to the user as the selectable print setting. However, as another example, the print settings of which the printing charge exceeds the upper limit amount may be further presented to the user together with the information of the shortage amount. In such a way, the user pays the shortage amount for the print settings of which the printing charge exceeds the upper limit amount, and then, can performs the print settings.

When the user selects the print setting on the print setting selection screen 200 and presses the print execution button (not illustrated), the determination result in S18 becomes "Yes", and then, the reward processing unit 26 prints the content in the reward information with the print settings selected in S16 (S20). In a case where the printing is finished, the reward processing unit 26 notifies the reward management server 10 of print processing history information via the server IF unit 24 (S22). The free content number of the printed content, the information on the print settings used at the time of printing, and the coupon number are included in the print processing history information.

In the reward management server 10 that received the notification of the processing history from the image processing apparatus 20, the reward use recording unit 18 updates various information items in the reward information DB 12 based on the information included in the processing history. For example, the value of the flag for checking the usage corresponding to the coupon number included in the processing history information among the coupon management information items (FIG. 4) in the reward information DB 12, is updated to "used". In addition, the value of the number of providing times corresponding to the free content number included in the processing history information among the reward management information (FIG. 3), is increased by 1. In addition, the billing amount corresponding to the free content number in the reward management information is increased as much as the usage charge (=unit price×the number of pages of the content) for use of the print settings included in the processing history information. In addition, the value of the number of times corresponding to the combination of the free content number and the print settings among the reward use summary information items (FIG. 7), is increased by 1.

The reward processing unit 26 of the image processing apparatus 20 subtracts the charge amount for the print settings used in the current printing from the upper limit amount (S24), and determines whether or not there remains a remaining amount which is the result of subtraction (whether or not the remaining amount is equal to or more than 1 yen) (S26). In a case where there remains the remaining amount, the value of the remaining amount is set to be the upper limit amount, and the process returns to S14 and repeats the same procedure.

In this way, the reward providing is performed via the image processing apparatus 20, and the administrator of the reward management server 10 performs billing processing for the billing amount (refer to FIG. 3) to the reward providing company at the time point when the reward providing period ends.

An exemplary embodiment of the present invention is described as above. In the example described above, in printing the reward content, only the free content provided by the providing company is printed. However, as another example, when the user prints a document prepared by the user himself, even in a case where the page of the document is printed on the front side of the sheet and the free content provided from the providing company is printed on the back side of the sheet, the method in the above-described exemplary embodiment can be applied. In this case, the reward processing unit 26 obtains the number of pages of the document prepared by the user, and obtains the printing charge for the case of using each of those print settings from the number of pages and the unit price of each print setting, and then, may extract the print settings of which the printing charge becomes equal to or lower than the upper limit amount of the reward as the selectable print settings.

In addition, in example described above, the image processing apparatus 20 determines the usable print settings within the range of the upper limit amount of the reward based on the unit price information 29 for print setting. However, instead of that, the determination may be performed by the reward management server 10. In this case, the reward management server 10 may specify the free content number corresponding to the coupon number notified from the image processing apparatus 20, may obtain the upper limit amount and the free content corresponding to the free content number, and then, may obtain the usable print settings within the upper limit amount using the number of pages of the free content, the unit price information of each print setting, and the upper limit amount thereof using the similar method described above. Then, the reward management server 10 provides the list of the print settings determined to be usable within the upper limit amount to the image processing apparatus 20 together with the free content information. The image processing apparatus 20 displays the print setting selection screen on which the received list of the print settings and the thumbnail image of the free content are displayed, and receives the selection instruction from the user.

In addition, in the example described above, the form of the reward is regulated as the upper limit "amount". However, the "amount" here is not limited to a currency used in the whole society, but may be an amount of point used in the limited area (for example, a system administrated by one company).

The information processing mechanism in the reward management server 10 and the image processing apparatus 20 exemplified above is realized by causing a computer to execute programs representing the functions of each device. The computer includes a circuit configuration in which, as hardware, for example, a microprocessor such as a CPU, memories (temporary storage) such as a random access memory (RAM) and a read only memory (ROM), a controller that controls a secondary storage device such as a hard disk drive (HDD) and a solid state drive (SSD), various input-output (I/O) interfaces, a network interface that performs the control for the connection to a network such as a local area network are connected to each other via, for example, a bus. In addition, for example, a disk drive for reading and/or writing with respect to a portable disk recording medium such as a CD or a DVD, and a memory reader/writer for reading or writing with respect to a portable non-volatile recording medium of various standards such as a flash memory, may be connected to the bus via the I/O interface. The program in which the processing content of each functional module exemplified above is described is stored in a fixed storage device via the recording medium such as the CD or the DVD or via a communication unit such as a network, and then, is installed on the computer. The program stored in the fixed storage device is read out to the RAM and executed by the microprocessor such as the CPU, and then, the group of functional modules described above is realized.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:
1. A printing system comprising:
a server including:
a processor; and
a reward information memory that stores: reward identification information, an upper limit amount associated with each of the reward identification information, a goal of a number of using times of each of the reward identification information, a goal achievement checking time of each of the reward identification information, and a premium upper limit amount; and
an information processing apparatus including:
a set charge memory that stores a usage charge for each print setting;
a number of times memory that records the number of times the reward identification information is used;
a controller configured to control execution of printing by the information processing apparatus; and
a print setting selection screen displaying buttons for selecting print settings,
wherein:
the processor of the server is configured to:
obtain, from the reward identification memory, an upper limit amount associated with an inputted reward identification information;

determine and specify selectable print settings within a range of the upper limit amount based on usage charges of the print settings stored in the set charge memory; and in response to the number of times that the reward identification information is used is less than the stored goal of the number of using times at a corresponding goal achievement checking time, determine and specify the selectable print settings within a range of the premium upper limit amount; and the controller of the information processing apparatus controls the print setting selection screen to display buttons for the selectable print settings and controls the execution of printing by the information processing apparatus to be executed according to one of the print settings selected from the buttons on the print setting selection screen.

2. The printing system according to claim 1, wherein:
the server is configured to function as a receiving unit that displays a list of the selectable print settings and receives a designation of the print settings to be used from the list of selectable print settings; and
the controller controls the printing according to the selected print settings received by the receiving unit.

3. A printing system comprising:
a server including:
a processor; and
a reward information memory that stores: reward identification information, an upper limit amount associated with each of the reward identification information, and a premium upper limit amount corresponding to the reward identification information, and an applicable period for the premium upper limit amount; and
an information processing apparatus including:
a set charge memory that stores a usage charge for each print setting;
a number of times memory that records the number of times the reward identification information is used;
a controller configured to control execution of printing by the information processing apparatus; and
a print setting selection screen displaying buttons for selecting print settings,
wherein:
the processor of the server is configured to:
obtain, from the reward identification memory, an upper limit amount associated with an inputted reward identification information;
determine and specify selectable print settings within a range of the upper limit amount based on usage charges of the print settings stored in the set charge memory; and
in response to an input time of the reward identification information being within the applicable period for the premium upper limit amount, specify the selectable print settings within the range of the premium upper limit amount instead of the upper limit amount; and
the controller of the information processing apparatus controls the print setting selection screen to display buttons for the selectable print settings and controls the execution of printing by the information processing apparatus to be executed according to one of the print settings selected from the buttons on the print setting selection screen.

4. A printing device comprising:
a number of times memory that records and stores a number of times reward identification information is used; and
a computer configured to:
acquire an upper limit amount associated with input reward identification information, and store a goal of a number of using times of the reward identification information, a goal achievement checking time of the reward identification information, and a premium upper limit amount;
determine and specify selectable print settings within a range of the acquired upper limit amount;
in response to the number of times that the reward identification information is used is less than the stored goal of the number of using times at a corresponding goal achievement checking time, determine and specify the selectable print settings within a range of the premium upper limit amount;
display a print setting selection screen including buttons for selecting the selectable print settings; and
control execution of printing to be executed according to one of the print settings selected from the buttons on the print setting selection screen.

5. The printing device according to claim 4, wherein the computer is configured to:
display a list of the specified selectable print settings, and receive a designation of the selected print settings to be used from the list of selectable print settings; and
control the execution of printing to be executed according to the designated print settings.

6. A non-transitory computer readable medium storing a program that causes a computer to:
acquire an upper limit amount associated with input reward identification information, a goal of the number of using times of the reward identification information, a goal achievement checking time of the reward identification information, and a premium upper limit amount;
record the number of times the reward identification information is used;
specify selectable print settings within a range of the acquired upper limit amount; and
in response to the number of times that the reward identification information is used is less than the goal of the number of using times at the goal achievement checking time, specify the selectable print settings within the range of the premium upper limit;
display a print setting selection screen including buttons for selecting the selectable print settings; and
control execution of printing to be executed according to the print settings selected from the buttons on the print setting selection screen.

7. A printing device comprising a computer configured to:
acquire an upper limit amount associated with reward identification information;
store reward identification information, an upper limit amount associated with the reward identification information, a premium upper limit amount, and an applicable period for the premium upper limit amount;
specify selectable print settings within a range of the acquired upper limit amount;
in response to an input time of the reward identification information being within the applicable period for the premium upper limit amount, specify selectable print settings within a range of the premium upper limit amount;

display a print setting selection screen including buttons for selecting the selectable print settings; and
control execution of printing to be executed according to the print settings selected from the buttons on the print setting selection screen.

\* \* \* \* \*